United States Patent Office 2,807,707
Patented Sept. 24, 1957

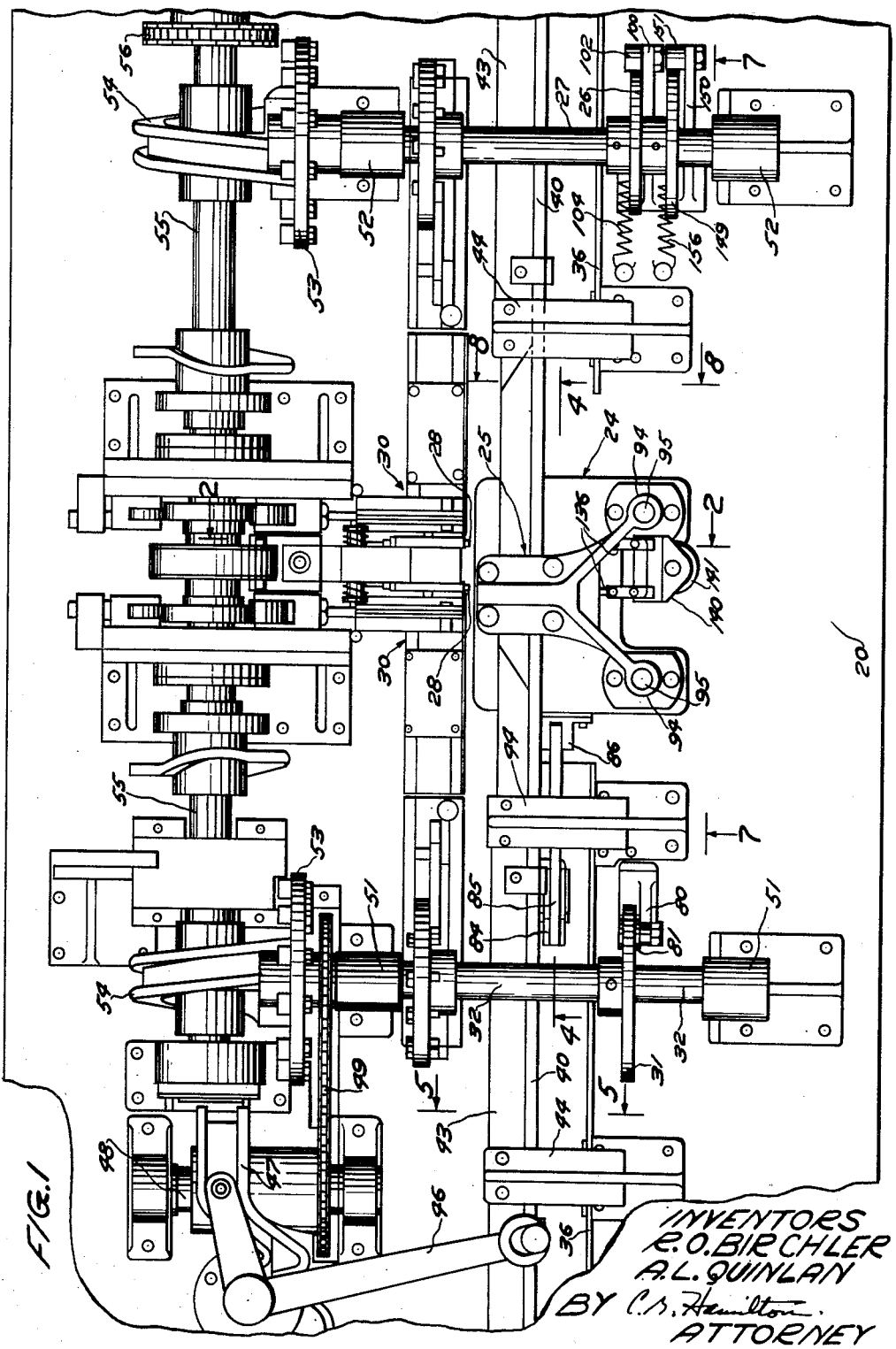

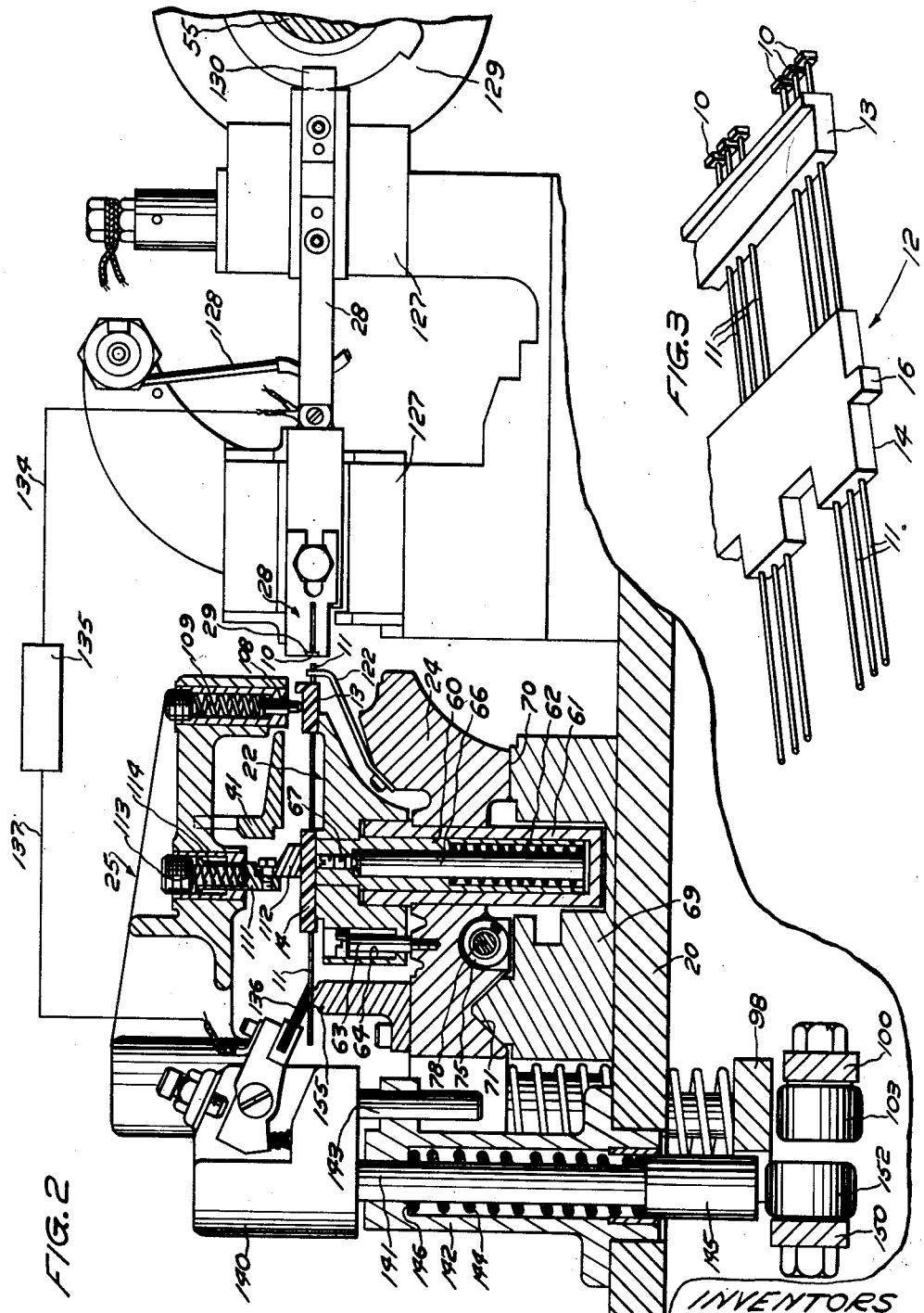

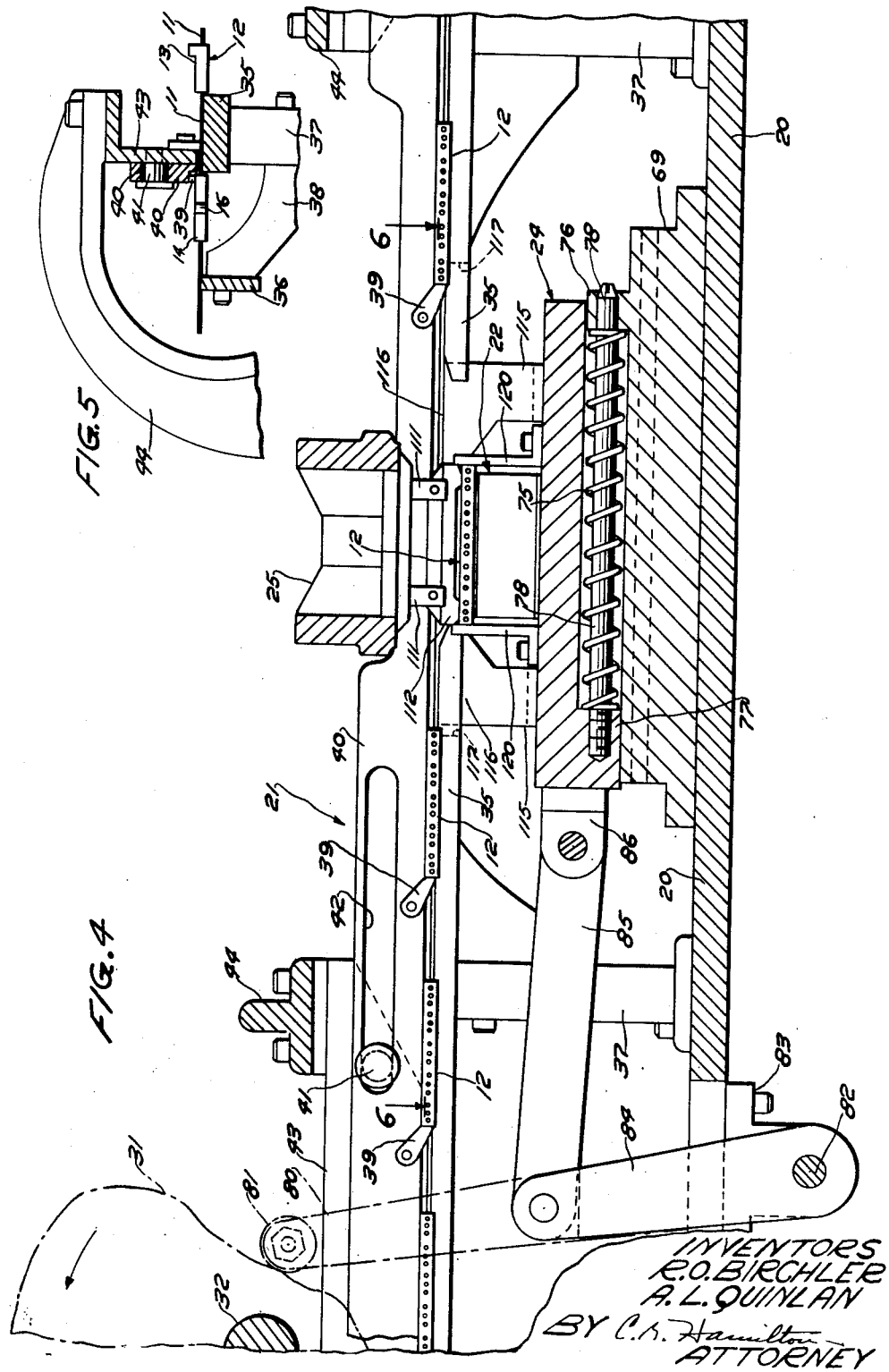

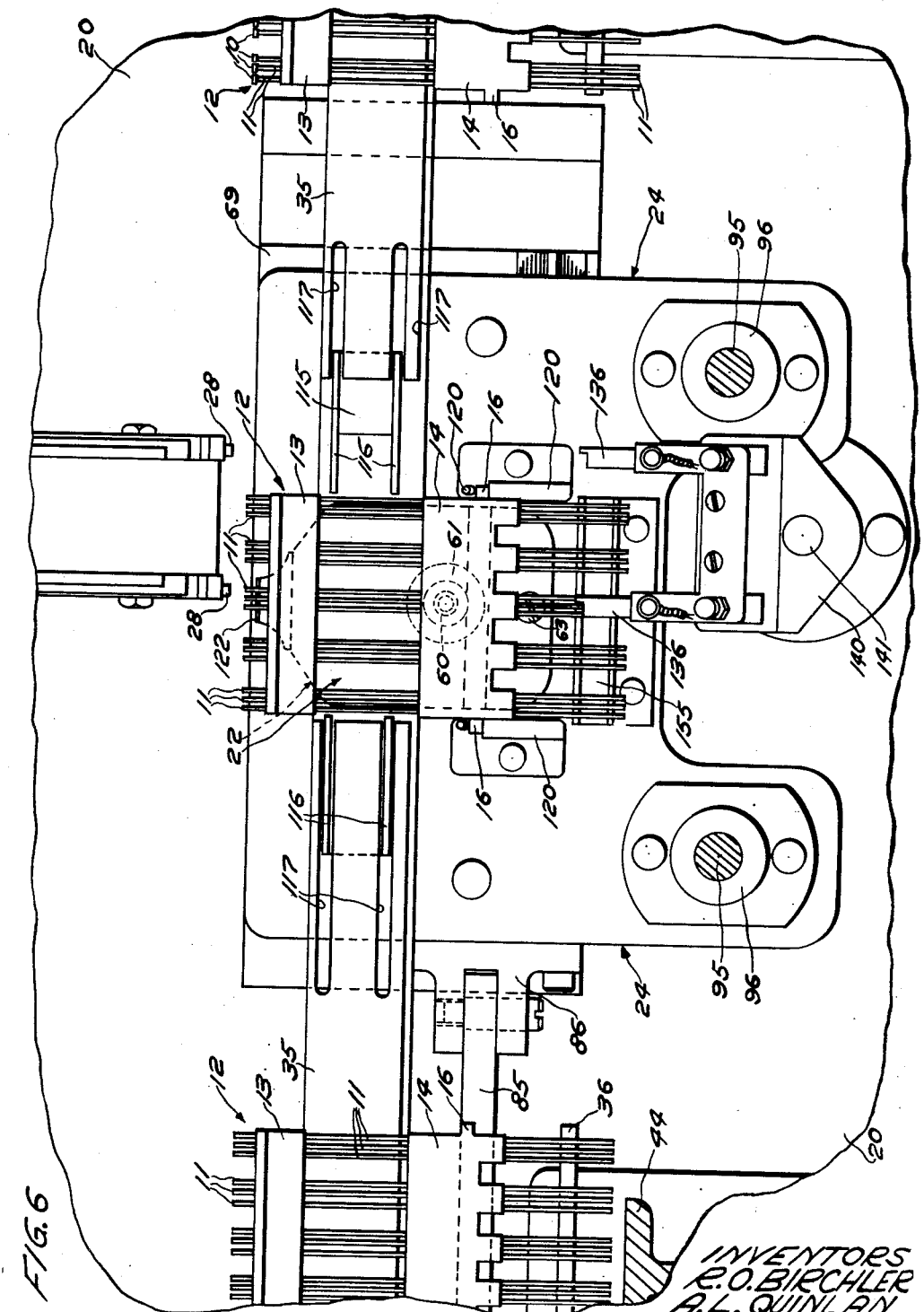

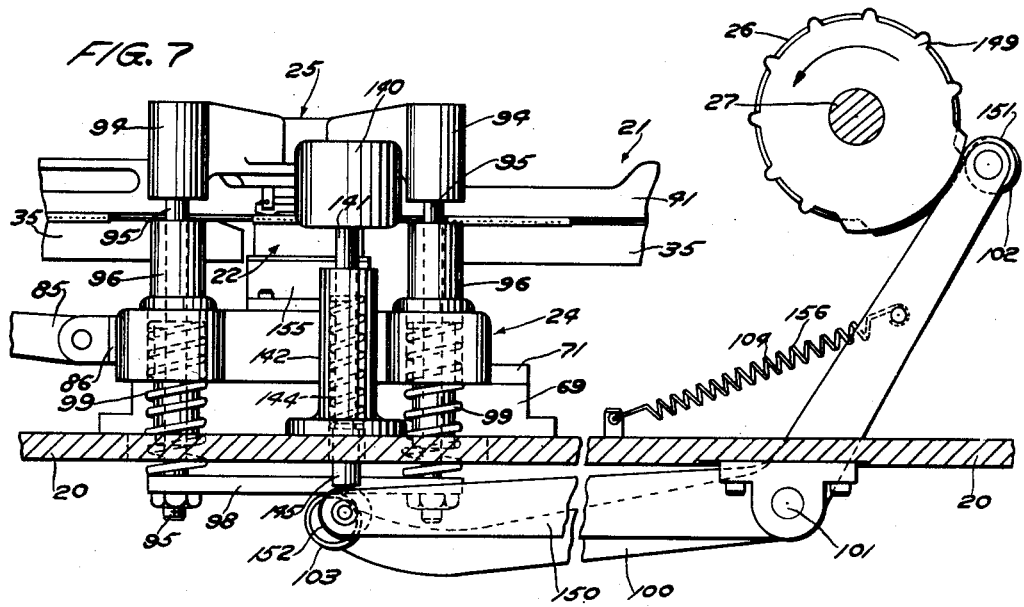
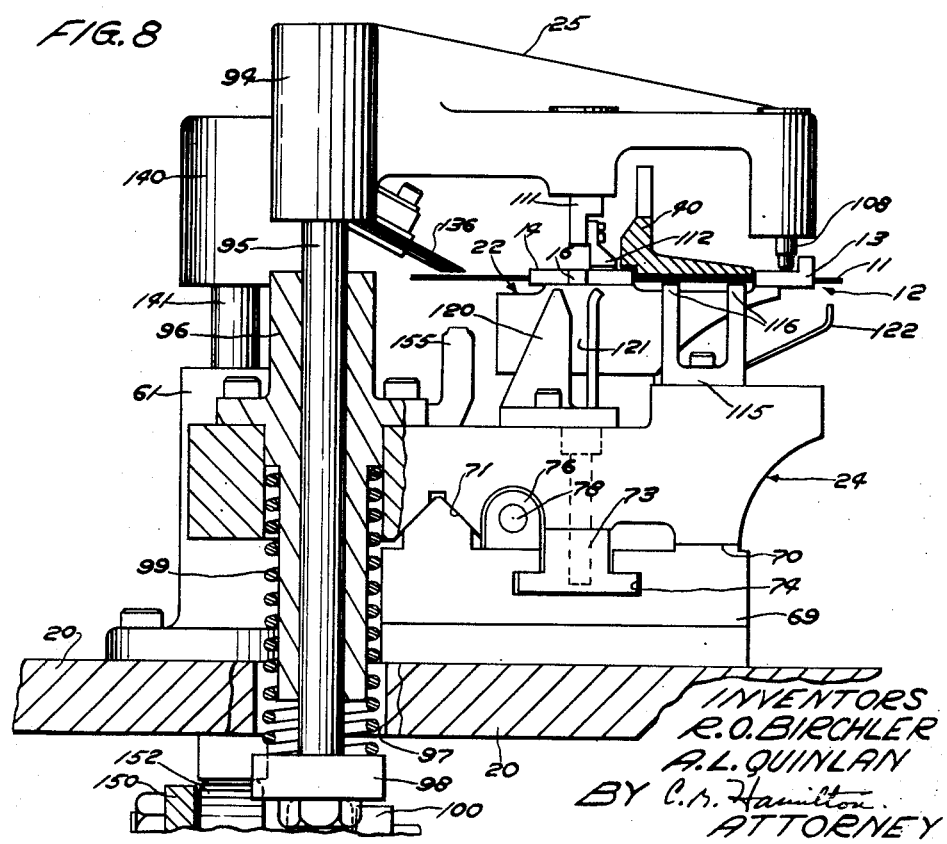

2,807,707

APPARATUS FOR PERCUSSIVELY WELDING CONTACTS ONTO AN ARTICLE

Robert O. Birchler, Cicero, and Amos L. Quinlan, La Grange Park, Ill., assignors to Western Electric Company, Incorporated, New York, N. Y., a corporation of New York Application October 28, 1955, Serial No. 543,438

7 Claims. (Cl. 219—95)

This invention relates to an apparatus for percussively welding contacts onto an article and more particularly to an indexible mechanism in such apparatus for firmly holding the article while the contacts are being welded thereto.

An object of the invention is to provide a percussive welding apparatus having new and improved indexible means for holding an article while contacts are welded thereto.

An apparatus illustrating certain features of the invention may include a holder for supporting a relay part having a plurality of wires arranged in parallel and laterally spaced relation to each other. These relay parts are intermittently fed by a conveyor onto the holder which is mounted on a horizontally movable carriage for vertical movement thereon from an upper level to a lower level with the wires of the relay part in horizontal alignment with a reciprocable welding electrode for percussively welding the contacts onto the ends of wires. A clamping member, mounted on the carriage for vertical movement, is disposed above the holder and is stressed for movement downwardly to move the holder and the relay part thereon to the lower level and securely clamp the relay part on the carriage, after which the carriage is indexed to align successive wires of the relay part with the electrode. Contacts are fed successively to the electrode which is reciprocated to carry the contacts into impact engagement with the wires to complete welding circuits to effect the percussive welding of the contacts to the wires, after which the clamping member is raised to release the relay part and cause the holder and the relay part to be elevated to the upper level where the conveyor transfers the relay part from the holder and feeds another relay part thereon.

Other objects and advantages of the invention will become apparent by reference to the following detailed description and the accompanying drawings illustrating a preferred embodiment of the invention, in which Fig. 1 is a fragmentary plan view of the welding apparatus;

Fig. 2 is an enlarged vertical transverse sectional view of the welding apparatus taken on line 2—2 of Fig. 1 showing an article to be welded and a holder therefor in a lower position;

Fig. 3 is an enlarged fragmentary perspective view of the article in the form of a relay part having wires onto the ends of which contacts are welded by this apparatus;

Fig. 4 is an enlarged fragmentary vertical sectional view of the apparatus taken on line 4—4 of Fig. 1;

Fig. 5 is an enlarged fragmentary vertical cross-sectional view of the apparatus taken on line 5—5 of Fig. 1;

Fig. 6 is an enlarged fragmentary plan sectional view of the apparatus taken on line 6—6 of Fig. 4;

Fig. 7 is an enlarged fragmentary longitudinal vertical sectional view of the apparatus taken on line 7—7 of Fig. 1; and Fig. 8 is an enlarged fragmentary transverse sectional view of the apparatus taken on line 8—8 of Fig. 1 and showing the article and the holder for supporting it in an upper position.

The present welding apparatus, which is an improvement of the welding apparatus disclosed in the copending application to E. W. Larsen, Serial No. 347,335, filed April 7, 1953, now Patent No. 2,749,419, dated June 5, 1956, on a machine for welding contacts onto switch parts, is designed for welding contacts 10 onto the ends of wires 11 of a relay part 12 (Fig. 3). The wires 11 are secured in blocks 13 and 14 of dielectric material molded therearound, the wires 11 being disposed in a row in parallel and laterally spaced relation to each other and arranged in five groups with three wires in each group. The block 14 has positioning lugs 16 projecting laterally from opposite ends thereof.

Generally, the apparatus comprises a base plate 20 on which the various apparatus components are mounted including a conveyor 21 (Figs. 1, 4, and 5) for intermittently advancing the relay part in a predetermined direction onto a holder 22 which is mounted on a carriage 24 for movement therewith parallel to said predetermined direction and for vertical movement on the carrier. A pusher or clamping member 25 mounted on the carriage for horizontal movement therewith and for vertical movement relative thereto is disposed above the holder and is actuated by a mechanism including a cam 26 on an auxiliary drive shaft 27 to push the holder 22 and the relay part thereon downwardly from a normal upper position in alignment with the conveyor to a lower position in horizontal alignment with a pair of horizontally reciprocable welding electrodes 28. Contacts 10 are fed into recesses 29 in the welding electrodes 28 by contact feeding mechanisms 30, the welding electrodes 28 and the wires 11 on the relay part 12 in alignment with the electrodes 28 are connected to a source of welding current and the electrodes are reciprocated to carry the contacts into impact engagement with the wires to complete welding circuits and effect the percussive welding of the contacts onto the wires. The carriage is advanced step by step in timed relation to the reciprocation of the welding electrodes by mechanism including a cam 31 on an auxiliary drive shaft 32 to position successive pairs of wires 11 in alignment with the electrodes 28 for the welding of the contacts 10 thereto, and on completion of the welding of the contacts to the relay part the holder 22 is raised, the carriage and the holder are returned to their initial starting position, the relay part is removed therefrom, and another switch part is fed onto the holder by the conveyor.

More specifically, the relay part 12 is supported on a pair of rails 35 and 36 of the conveyor 21 which are supported on fixed posts 37 and brackets 38, respectively (Fig. 5). The rail 35 engages the wires 11 between the blocks 13 and 14 of the relay part and serve to prevent displacement of the relay parts longitudinally with respect to the wires 11. The relay parts are advanced by feed pawls 39 carried by a reciprocable feed bar 40 which is supported on a plurality of rollers 41 riding in slots 42 in the feed bar. The rollers 41 are mounted on stationary L-shaped frame members 43 which are supported by brackets 44 mounted on the base plate 20. Reciprocation is imparted to the feed bar 40 by a bell crank lever 46 which is actuated by a cam 47 and the cam is mounted on the shaft 48 which is rotated through a sprocket and chain drive 49 from the auxiliary drive shaft 32. The auxiliary drive shafts 32 and 27 are journalled in suitable bearings 51 and 52, respectively, actuate the tape feeding mechanisms 30, and have discs 53 with pins thereon which are driven from cams 54 on a main drive shaft 55. The main drive shaft 55 is driven through a sprocket and chain connection 56 from a motor (not shown) and the drive conenction 53—54 establishes a predetermined ratio between the main and the auxiliary drive shafts.

The holder 22 (Figs. 2, 4, and 6) for supporting a relay part 12 during the welding of the contacts thereonto has fixed thereto a depending hollow post 60 slidable in a sleeve 61 which is fixed to the carriage 24 for guiding the holder 22 for vertical movement. A spring 62 in the hollow post 60 and sleeve 61 urges the post 60 and the holder 22 upwardly, and a headed screw 63 fixed to the carriage 24 and riding in a counterbored recess 64 in the holder stops the holder 22 in a normal upper position as shown in Fig. 8 and prevents turning of the holder. A rod 66 fixed to and extending upwardly from the closed bottom end of the sleeve 61 engages and cooperates with an adjustable screw 67 mounted in the post 60 for limiting the downward movement of the holder 22 to accurately position the wires 11 of the relay part in horizontal alignment with the welding electrodes 28 and the contacts 10 carried thereby. In its normal upper position the upper surface of the holder 22 is flush with the upper surface of the rail 35 to permit transfer of relay parts 12 to and from the holder 22 and the conveyor 21, and the rails 35 and 36 are interrupted at the welding station to provide clearance for longitudinal horizontal movement of the holder with the carriage 24 as the carriage is indexed to position the wires 11 of the relay part in alignment with the welding electrodes 28.

The carriage 24 is in the form of a substantially heavy rectangular plate which is slidably supported for horizontal movement on a base 69 in the form of a block fixed to the base plate 20. Flat and V-shaped ways 70 and 71 on the carriage 24 engage conforming ways on the supporting block 69 and serve to guide the carriage for reciprocable movement parallel to the movement of the relay part on the conveyor 21. A pair of T-shaped locking blocks 73 secured to the carriage 24 and slidable in a T-shaped slot 74 in the supporting member 69 serve to prevent upward displacement of the carriage 24. The carriage 24 is urged in one direction, to the left as viewed in Fig. 4, by a spring 75, one end of which engages a stationary lug on the supporting block 69 and the other end of which engages a shoulder 77 on the carriage 24. A rod 78 is inserted in the spring 75 and is secured to the carriage 24 for movement therewith to hold the spring 75 in longitudinal alignment. Movement is imparted to the carriage 24 in the opposite direction, to the right as viewed in Fig. 4, by the cam 31 through suitable linkage which includes a cam lever 80 having a cam follower 81 at one end engageable with the cam 31. The other end of the lever 80 is secured to a shaft 82 which is journalled in suitable bearings 83 and to which is fastened one end of an arm 84, the other end of which is connected by a link 85 to a bracket 86 on the carriage 24. The cam 31 in cooperation with the spring 75 indexes the carriage 24, the holder 22, and the relay part 12 supported thereon through a predetermined number of steps to sequentially align the wires 11 with the pair of welding electrodes 28. As shown herein the relay part 12 has five groups of wires 11 with three wires in each group, and in the initial or starting position of the carriage 24 the relay part 12 is supported with the first wire 11 of the middle group of wires in alignment with one of the welding electrodes 28 as shown in Fig. 6.

The pusher or clamping member 25 (Figs. 1, 2, 7, and 8) for moving the holder 22 and the relay part 12 thereon from an upper position to a lower position is in the form of a Y-shaped member having a pair of apertured bosses 94 in which are secured a pair of guide rods 95. The guide rods 95 extend vertically downwardly through guide bushings 96 secured to the carriage 24 and through clearance apertures 97 in the base plate 20. A cross bar 98 is secured to the lower ends of the rods 95 below the base plate 20 and springs 99 encircling portions of the rods 95 and the sleeves 96 press against the cross bar 98 and shoulders on the sleeves 96 to stress the pusher 25 downwardly. The movement of the pusher 25 is controlled by the cam 26 through a bell crank lever 100 (Fig. 7) which is fulcrumed at 101 and has a cam follower 102 at one end thereof engageable with the cam 26. At its other end, the bell crank lever has a roller 103 which is engageable with the underside of the cross bar 98 of the pusher 25. A spring 104 connected to the lever 100 yieldably maintains the cam follower 102 in engagement with the cam 26. This cam in cooperation with the pusher elevating springs 99 and the holder elevating spring 62 effects movement of the pusher 25 and the holder 22 to their normal upper position to permit horizontal transfer movement of the relay parts to and from the conveyor and the holder 22 and to their lower position to support a relay part with the wires thereof in horizontal alignment with the welding electrodes. During the indexing of the carriage 24 and the relay part 12, the roller 103 of the bell crank lever 100 is spaced below the lift bar 98 of the pusher 25 so that the pusher is tightly pressed downwardly by the springs 99 to firmly clamp the relay part 12 on the holder 22 and the carriage 24 while the contacts 10 are welded to the wires 11 thereof.

At one end thereof the pusher 25 is provided with a pair of counterbored bosses having a pair of plungers 108 which are stressed for downward movement by springs 109 to yieldably engage and press the block 113 of the relay 12 against the holder 22. A second pair of counterbored bosses are provided in which are mounted hollow plungers 111 to the lower ends of which are attached a presser bar or shoe 112 engageable with the block 14 of the relay part. The plungers 111 and the shoe 112 are stressed for downward movement by springs 113 and 114, the former being relatively light and acting on the plunger at all times and the spring 114 being heavier and shorter, whereby when the pusher 25 is in its upper position the upper end of the spring 114 is spaced from the upper end of the recess in which it is mounted and the spring is effective to exert force on the plunger 111 and the shoe 112 only after the pusher 25 has moved a predetermined distance on its downward movement. In the upper position of the pusher 25, the spring pressed plunger 108 and the spring pressed shoe 112 are spaced at an elevation slightly above the level of the relay part 12 being advanced by the conveyor 21 to permit free unimpeded movement of the relay part 35 onto the holder 22.

U-shaped members 115 are fastened to the upper side of the carriage 24 (Fig. 8) with the upper surfaces of the members 115 forming auxiliary rails 116 flush with the upper surfaces of the tracks 35 and the holder 22 to provide a supporting surface for supporting the relay part during transfer thereof to and from the rail and the holder. During horizontal reciprocation of the carriage 24 the auxiliary rails 116 are adapted to move into slots 117 formed in the end portions of the rails 35.

Aligning members 120 on the carriage 24 on opposite sides of the holder 22 have slots 121 therein for receiving the lugs 16 on the relay part 12 in response to movement of the holder and the relay part to the lower position for accurately positioning the relay part on the holder and the carriage in a direction longitudinally of the wires 11. A gaging element 122 fastened to the carriage 24 has an upwardly extending recessed portion engageable with the middle group of three wires 11 of the relay part to accurately position the relay part laterally on the holder and the carriage.

The contacts 10 are formed from tapes of contact material and are fed into recesses in the welding electrodes by the contact feeding mechanism 30 as disclosed in the above-mentioned co-pending patent application. The welding electrodes 28 are mounted for reciprocable movement in standards 127 and are stressed by springs 128 for movement toward the holder 22 and the relay part 12 therein. Cams 129 secured to the main drive shaft 55 and engageable with the ends 130 of the welding electrodes move the electrodes from the holder and release them at predetermined intervals to cause the spring stressed electrodes to carry the contacts into impact engagement with the wires 11 aligned therewith. The contacts 10 in the electrodes 28 are individually connected by the electrodes and leads 134 to devices 135 for supplying welding current thereto. The wires 11 aligned with electrodes are connected by brushes 136 and leads 137 to the other side of the devices 135, whereby in response to movement of the contacts into engagement with the end of the wire 11 circuits are completed and the contacts are percussively welded to the wires.

The two brushes 136 are pivotally mounted on a head 140 which is fixed to the upper end of a rod 141 and the rod 141 is mounted for vertical reciprocation in a guide bushing 142 secured to the base plate 20. A depending pin 143 on the head 140 is slidable in an aperture in a lug on the guide bushing 142 and serves to prevent rotation of the head 140 and the brushes 136. A spring 144 encircling the rod 141 and interposed between an enlarged head 145 of the rod and a shoulder 146 on the bushing 142 stresses the rod and the brushes 136 for downward movement. Vertical reciprocation of the head 140 and the brushes 136 is effected by a cam 149 and a bell crank lever 150, the latter being pivoted at 101 and having a cam follower 151 at one end thereof engageable with the cam and having a roller 152 at the other end thereof engageable with the lower end of the rod 145. The cam 149 is shaped to effect the lowering of the brushes 136 into engagement with successive wires 11 of the relay part 12 to electrically connect them into the circuits for the welding of the contacts. An anvil 155 is secured to the carrier for supporting the wires 11 of the relay part while they are being contacted by the brushes 136.

A spring 156 (Figs. 1 and 7) connected to the bell crank lever 150 maintains the cam follower 151 in engagement with the cam 149. The cams 149 and 26 actuate the bell crank levers 150 and 100, respectively, so that the rollers 152 and 103 thereon are moved away from the rod 148 and the lift bar 98, respectively, during predetermined intervals to allow the brushes 136 and the clamping member 25 to be completely actuated to their lower operative positions by the springs 144 and 99 associated therewith.

From the above description it will be seen that the carriage 24 is slidably mounted on the base member 69 and supports the holder 22 and the pusher 25 thereon for horizontal reciprocable movement therewith and for vertical movement relative thereto, whereby when a relay part 12 has been transferred from the conveyor onto the holder and the pusher 25 actuated to move the holder and the relay part thereon to welding position, the relay part is firmly clamped on the holder by the pusher and is supported thereby on the carriage with the wires 11 of the relay member in accurate horizontal alignment with the welding electrode and the contact 10 carried thereby, and that the carriage may be indexed by the cam 31 to align successive ones of the wires longitudinally with the welding electrode. With this construction the relay part is securely held and the wires thereof are accurately aligned with the welding electrode during the welding of the contacts onto the ends of the wires.

In the operation of the apparatus the relay parts 12 are advanced step by step by the conveyor 21 and as they approach the welding station they are transferred from the conveyor onto the holder as shown in Fig. 6. The pusher 25 then depresses the relay part 12 and the holder 22 to operative position with the first wire of the middle group in axial alignment with and in the path of travel of the welding electrode and a contact 10 supported thereby. At the start contacts 10 are fed into only one of the welding electrodes, the welding electrodes are actuated and carriage indexed to weld contacts 10 onto the wires of the middle group of wires of the relay, after which contacts 10 are fed to both welding electrodes, and the electrodes actuated and the carriage indexed six times to weld contacts 10 onto the wires of groups one, two, four, and five of the relay part. On completion of the welding of the contacts onto the ends of the wires of the relay, the pusher 25 is raised and the holder and the relay part 12 with the contacts 10 welded thereto are elevated to their normal upper position, and the indexing mechanism returns the carriage to its initial starting position, after which a feed bar 40 of the conveyor 21 is reciprocated to effect the transfer of the relay part from the holder onto the conveyor and the feeding of another relay part 12 from the conveyor onto the holder preparatory to another cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a welding apparatus having a movable welding electrode for carrying elements and percussively welding them onto an article, means for holding the article, indexible means, means for yieldably supporting the holding means for vertical movement on the indexible means, means mounted on the indexible means for clamping the article on the holding means, means for actuating said clamping means to clamp the article on the holding means and move it and the holding means into a predetermined position with the article in alignment with the welding electrode, and means for actuating the indexible means step by step to successively bring different portions of the article into alignment with the welding electrode to weld the elements to the article.

2. In a welding apparatus having a movable welding electrode for carrying elements and percussively welding them onto an article, the combination therewith of a carriage, means mounting said carriage for horizontal movement across the path of travel of said welding electrode, a holder for supporting said article, means mounting said holder on said carriage for horizontal movement therewith and for vertical movement relative thereto from an upper level to a predetermined lower level to position the article in horizontal alignment with said welding electrode, resilient means for raising said holder to and yieldably retaining it at said upper level, means on said carriage for laterally positioning said article in a predetermined location on said carriage in response to movement of said holder to said lower position, spring actuated means on said carriage for clamping said articles onto said holder and moving them to said lower position, means for indexing said carriage to align different portions of said article in the path of said welding electrode for the welding of contacts thereto, and means for raising said clamping means after said contacts have been welded to said article.

3. In a welding apparatus having a movable electrode for carrying contacts and percussively welding them onto an article, the combination therewith of a carriage, means mounting said carriage for horizontal movement transversely of the path of travel of said welding electrode, a holder for supporting said article, means mounting said holder on said carriage for movement therewith and for vertical movement thereon from an upper position to a predetermined lower position with said part in horizontal alignment with said movable welding electrode, resilient means for raising said holder to and yieldably maintaining it in said upper position, aligning means on said carriage for laterally positioning said article in a predetermined location on said carriage in response to movement of said holder to said lower position, a clamping member disposed above said holder, means for mounting said clamping member on said carriage for movement therewith and for vertical movement relative thereto, resilient means on said carriage for moving said clamping member downwardly to move said article and said holder to said lower position on the carriage and clamp the article in said position, means for indexing said carriage to align successive portions of said article in the path of said welding electrode for the welding of contacts onto said article, and means for raising said clamping means after said contacts have been welded to said article.

4. In a welding apparatus having a reciprocable welding electrode for carrying contacts and percussively welding them to wires of a relay part, the combination therewith of a conveyor for feeding the relay parts step by step at a predetermined upper level, a holder for supporting a relay part, a carriage for supporting said holder for vertical movement thereon from said upper level to a lower level in horizontal alignment with said welding electrode, resilient means for moving said holder to and yieldably maintaining it in said upper level to permit transfer of said relay parts onto and off of said holder by said conveyor, means for supporting said carriage and the holder thereon for horizontal reciprocable movement, a clamping member mounted on said carriage for horizontal movement therewith and for vertical movement thereon, resilient means on said carriage for moving the clamping element downwardly to push the holder and the relay part thereon from said upper to said lower level and to firmly clamp the relay part on the holder, means for indexing said carriage to align successive wires of the relay part with the welding electrode for the welding of the contacts thereto, and means for raising said clamping member after the contacts have been welded onto the relay part to release said relay part and cause it to be elevated to said upper level with said holder.

5. In a welding apparatus having a reciprocable welding electrode for welding contacts onto the ends of wires of a relay part, the combination therewith of a carriage, means mounting said carriage for horizontal movement transversely of the path of travel of said welding electrode, a holder mounted on said carriage for supporting a relay part thereon for horizontal movement with the carriage and for vertical movement relative thereto from a welding position at a lower level in horizontal alignment with the welding electrode to a transfer position at an upper level, resilient means for moving said holder to and yieldably retaining it at said upper level, conveyor means for supporting relay parts at said upper level and for feeding them horizontally step by step onto and off of said holder, a clamping member disposed above said holder, means for mounting said clamping member for vertical movement on said carriage and for horizontal movement therewith, resilient means on said carriage for moving said clamping member downwardly to push the holder and a relay part thereon from said upper level to said lower level and to clamp said relay part in welding position on said carriage, means for indexing said carriage to align successive wires of said relay part with said welding electrode, and means for raising said clamping member to release said relay part and cause said holder to move it to its upper position in the path of said conveyor means.

6. In a welding apparatus, a base, a reciprocable welding electrode mounted on said base for carrying contacts and percussively welding them onto the ends of wires of a relay part, a carriage mounted on said base for horizontal movement transversely of the path of travel of said welding electrode, a holder for suporting a relay part thereon, means mounting said holder on said carriage for horizontal movement therewith and for vertical movement relative thereto from a welding position at a lower level with the switch part in horizontal alignment with the welding electrode to a transfer position at an upper level, resilient means for moving said holder to said upper level, conveyor means for supporting relay parts at said upper level and for advancing them horizontally step by step onto and off of said holder, a clamping member disposed above said holder, means including a pair of guide rods for mounting said holder for vertical movement on said carriage and for horizontal movement therewith, resilient means on said carriage for stressing said clamping member downwardly to push the holder and a relay part thereon from said upper level to said lower level and to clamp said relay part on said carriage, means mounted on said base for indexing said carriage to align successive wires of said relay part with said welding electrode, a lifting bar connected to said rods, and means mounted on said base and engageable with said lifting bar for raising said clamping member to release the relay part and cause the movement of the holder and said relay part thereon to said upper level.

7. In a welding apparatus, a base, a reciprocable welding electrode for carrying contacts and percussively welding them onto the ends of wires of a relay part, a carrier mounted on said base for horizontal reciprocable movement transversely of the path of travel of said welding electrode, a holder mounted on said carriage for supporting a relay part thereon for horizontal movement with the carriage and for vertical movement relative thereto from a lower level in horizontal alignment with the welding electrode to an upper level, resilient means for moving said holder to and yieldably retaining it at said upper level, conveyor means for supporting relay parts at said upper level and for advancing them horizontally step by step onto and off of said holder, a clamping member disposed above said holder, means for mounting said clamping member for vertical movement on said carrier and for horizontal movement therewith, resilient means for moving said clamping member downwardly to push the holder and a relay part thereon from said upper level to said lower level and to clamp said relay part in welding position on said carriage, means on said carriage engageable with said relay part in response to movement thereof to said lower level for laterally aligning said relay part on said carriage, means for indexing said carriage to align successive wires of said relay part with said moving electrode, and means for raising said clamping element to release said relay part and cause said holder to move the relay part to its upper position in the path of said conveyor means.

References Cited in the file of this patent
UNITED STATES PATENTS

| | | |
|---|---|---|
| 2,338,002 | Mero | Dec. 28, 1943 |
| 2,695,545 | Myers et al. | Dec. 7, 1954 |